Patented Jan. 12, 1926.

1,569,111

UNITED STATES PATENT OFFICE.

ALOIS ZINKE AND HERMANN SCHOEPFER, OF GRAZ, AUSTRIA, ASSIGNORS, BY MESNE ASSIGNMENTS, TO FELICE BENSA, OF GENOA, ITALY.

PROCESS FOR MANUFACTURING A PERYLENE VAT DYE.

No Drawing. Application filed October 17, 1923. Serial No. 668,966.

To all whom it may concern:

Be it known that we, ALOIS ZINKE and HERMANN SCHOEPFER, citizens of the Republic of Austria, residing at Graz, Styria, Republic of Austria, have invented a certain new and useful Improvement in Processes for Manufacturing a Perylene Vat Dye, of which the following is a specification.

As is known perylene quinone is converted by the action thereon of bromine into bromoperylene quinone which dyes cotton in orange colours (Monotshefte für Chemie vol. 40, page 408). Now it has been found that also by treating with chlorine, chlorine derivatives are obtained which dye cotton in considerably more brilliant colours, which as distinguished from the colours obtained by the bromine derivative are rather green tinged.

In the first place in the chlorination a chlorine addition-product is formed which on treatment with basic and other agents binding hydrochloric acid is transformed into a stable chloroperylene quinone. The colours obtained by the addition product are not so fast as regards chemical actions as those of the chloroperylene quinone. The addition product as well as the chloroperylene quinone are compounds hitherto unknown.

1st example.

One part of quinone is brought to suspension in 10 to 30 parts of nitrobenzene ($C_6H_5NO_2$) and treated with chlorine if desired in the presence of a trace of iodine in a water bath. The quinone is gradually dissolved. After the reaction is completed the chlorine addition product is precipitated by the addition of light petroleum distillates or other low boiling solvents, the precipitate being in the form of fine small needles of a light yellow colour. From nitrobenzene the compound crystallizes unchanged. By boiling with aniline the product described in Example 2 is obtained, hydrochloric acid being removed.

2nd example.

For obtaining chloroperylene quinone the chlorine addition product produced according to Example 1 is boiled with the quantity of aniline required for dissolving it for about 10 minutes. On cooling the chloroquinone is separated in the form of fine needles of orange colour which in most organic solvents are much more difficultly soluble than the chlorine addition product. In concentrated sulphuric acid the compound dissolves with a blue violet colour, the vat is cherry red, cotton is dyed in brilliant yellow green tinged colours.

3rd example.

For obtaining chloroperylene quinone it may be proceeded in such manner that to the solution of the chlorine addition product in nitrobenzene obtained by the chlorination in accordance with Example 1 and freed from superfluous chlorine, 2 to 10 parts of aniline are added and heated to boiling for ten minutes. On cooling the chloroquinone separates in fine small needles of an orange to red colour.

Claims:

1. A process for manufacturing perylene vat dyes consisting in treating perylene quinone with chlorine.

2. A process for manufacturing perylene vat dyes consisting in treating perylene quinone suspended in nitrobenzene with chlorine until solution takes place.

3. A process for manufacturing perylene vat dyes consisting in treating perylene quinone with chlorine until the reaction is completed and then treating the product of such reaction with agents binding hydrochlorid acid.

4. A process for manufacturing perylene vat dyes consisting in treating perylene quinone with chlorine until the reaction is completed and then boiling the product of such reaction with aniline.

5. A process for manufacturing perylene vat dyes consisting in treating perylene quinone suspended in nitrobenzene with chlorine until solution takes place and then boiling such solution with aniline.

6. As a new article of manufacture an addition product of perylene quinone and chlorine.

7. As a new article of manufacture chloroperylene quinone, that is to say an addition product of perylene quinone and chlorine from which part of the chlorine has been removed in the form of hydrochloric acid by agents binding the latter.

In testimony whereof we have signed our names to this specification.

ALOIS ZINKE.
HERMANN SCHOEPFER.